United States Patent
Boutaleb et al.

(10) Patent No.: US 10,697,312 B2
(45) Date of Patent: Jun. 30, 2020

(54) OUTLET GUIDE VANE FOR AIRCRAFT TURBOMACHINE, WITH IMPROVED LUBRICANT COOLING FUNCTION

(71) Applicant: SAFRAN AIRCRAFT ENGINES, Paris (FR)

(72) Inventors: Mohamed-Lamine Boutaleb, Paris (FR); Fabien Roger Gaston Caty, Alfortville (FR); Sebastien Vincent Francois Dreano, Longjumeau (FR); Thierry Georges Paul Papin, Varennes-Jarcy (FR); Christophe Marcel Lucien Perdrigeon, Ballainvilliers (FR); Cedric Zaccardi, Saint-Maur-des-Fosses (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 219 days.

(21) Appl. No.: 15/914,150

(22) Filed: Mar. 7, 2018

(65) Prior Publication Data
US 2018/0258779 A1    Sep. 13, 2018

(30) Foreign Application Priority Data
Mar. 13, 2017   (FR) .................................. 17 52017

(51) Int. Cl.
*F01D 9/06* (2006.01)
*F01D 9/04* (2006.01)
(Continued)

(52) U.S. Cl.
CPC ............. *F01D 9/041* (2013.01); *F01D 9/065* (2013.01); *F01D 25/12* (2013.01); *F01D 25/18* (2013.01);
(Continued)

(58) Field of Classification Search
CPC .... F04D 29/5853; F04D 29/542; F01D 9/065; F01D 5/188; F01D 5/187; F02C 7/14;
(Continued)

(56) References Cited

U.S. PATENT DOCUMENTS

| 7,219,720 B2 | 5/2007 | Wakita et al. |
| 8,616,834 B2 | 12/2013 | Knight, III et al. |

(Continued)

FOREIGN PATENT DOCUMENTS

| CN | 103089335 A | 5/2013 |
| EP | 0 203 458 A1 | 12/1986 |

(Continued)

OTHER PUBLICATIONS

U.S. Appl. No. 15/653,976, filed Jul. 19, 2017, US 2018/0023406 A1, Cedric Zaccardi et al.
(Continued)

*Primary Examiner* — Richard A Edgar
*Assistant Examiner* — Maxime M Adjagbe
(74) *Attorney, Agent, or Firm* — Oblon, McClelland, Maier & Neustadt, L.L.P.

(57) ABSTRACT

A guide vane for a twin-spool aircraft turbomachine has an aerodynamic part that includes an internal lubricant cooling passage extending along a principal lubricant flow direction. The aerodynamic part is made in a single piece and also includes heat transfer fins arranged in the passage connecting the intrados and extrados walls and extending approximately parallel to the direction, these fins being distributed in successive rows along the principal direction and made such that for two rows of staggered directly consecutive fins, a first row includes fins forming a positive acute angle A1 with a dummy reference plane, while a second row includes fins forming a negative acute angle A2 with this plane.

15 Claims, 5 Drawing Sheets

(51) Int. Cl.
| | |
|---|---|
| *F01D 25/12* | (2006.01) |
| *F01D 25/18* | (2006.01) |
| *F02C 7/14* | (2006.01) |
| *F28D 21/00* | (2006.01) |
| *F01D 5/18* | (2006.01) |
| *F28F 1/40* | (2006.01) |
| *F28D 1/02* | (2006.01) |
| *F28D 1/053* | (2006.01) |

(52) U.S. Cl.
CPC ............... *F02C 7/14* (2013.01); *F01D 5/188* (2013.01); *F05D 2220/323* (2013.01); *F05D 2220/36* (2013.01); *F05D 2230/22* (2013.01); *F05D 2250/183* (2013.01); *F05D 2260/22141* (2013.01); *F28D 1/0233* (2013.01); *F28D 1/0535* (2013.01); *F28D 2021/0021* (2013.01); *F28D 2021/0049* (2013.01); *F28D 2021/0089* (2013.01); *F28F 1/40* (2013.01); *F28F 2250/02* (2013.01); *F28F 2255/18* (2013.01); *Y02T 50/675* (2013.01)

(58) Field of Classification Search
CPC ...... F02C 3/04; F28F 3/027; F05D 2260/232; F05D 2230/50; F05D 2220/323; F05D 2250/182; F05D 2260/22141; F05D 2220/36; F28D 2021/0089; F28D 2021/0021; Y02T 50/676

See application file for complete search history.

(56) References Cited

U.S. PATENT DOCUMENTS

2013/0276461 A1\* 10/2013 Propheter-Hinckley ..................... F01D 5/16
60/806
2014/0328669 A1\* 11/2014 Bregman ................ F01D 5/187
415/115

FOREIGN PATENT DOCUMENTS

| FR | 2 989 110 A1 | 10/2013 |
| GB | 2552050 A | 1/2018 |
| WO | WO 2013/077761 A1 | 5/2013 |
| WO | WO 2017/196298 A1 | 11/2017 |

OTHER PUBLICATIONS

U.S. Appl. No. 15/558,853, filed Sep. 15, 2017, Cedric Zaccardi et al.

French Preliminary Search Report dated Nov. 8, 2017 in French Application 17 52017, filed Mar. 13, 2017 (with English Translation of Categories of Cited Documents).

\* cited by examiner

OUTLET GUIDE VANE FOR AIRCRAFT TURBOMACHINE, WITH IMPROVED LUBRICANT COOLING FUNCTION

TECHNICAL DOMAIN

This invention relates to the field of twin-spool turbomachines for aircraft, and particularly the design of guide vanes arranged in all or part of a turbomachine bypass air flow.

These are preferably "Outlet Guide Vanes" (OGV), designed to straighten the air flow at the fan outlet. Alternatively or simultaneously, the guide vanes could be placed at the fan intake. The guide vanes are conventionally located in the turbomachine bypass flow.

The invention preferably relates to an aircraft turbojet equiped with such outlet guide vanes.

STATE OF PRIOR ART

On some twin-spool turbomachines, it is known that outlet guide vanes can be installed downstream from the fan to straighten the outlet flow from the fan, and possibly also to perform a structural function. This structural function is intended to transfer forces from the centre of the turbomachine to an outer shell located along the prolongation of the fan case. In this case, an engine attachment is conventionally formed on or close to this outer shell, to form the attachment between the turbomachine and an aircraft attachment pylon.

It was also recently disclosed that the outlet guide vanes can be expected to perform an additional function. This is a heat exchange function between the outside air passing through the ring of outlet guide vanes, and lubricant circulating inside these vanes. This heat exchange function is for example known as disclosed in document U.S. Pat. No. 8,616,834, or document FR 2 989 110.

Lubricant to be cooled by the outlet guide vanes can originate from different zones of the turbomachine. It can be a lubricant circulating through lubrication chambers of roller bearings supporting engine shafts and/or the fan hub, or a lubricant used for lubrication of mechanical transmission elements of the Accessory Gear Box (AGB). Finally, it can also be used for lubrication of a fan drive reduction gearbox, when such a reduction gearbox is provided on the turbomachine to reduce the rotation speed of its fan.

Increasing lubricant needs require that the heat dissipation capacity should be adapted accordingly, associated with exchangers designed for cooling the lubricant. The fact that a role of heat exchanger is assigned to the outlet guide vanes, as in the solutions in the two documents mentioned above, can in particular reduce or even eliminate conventional Air Cooled Oil Cooler (ACOC) type exchangers. Since these ACOC exchangers are generally formed in the bypass flow path, reducing or eliminating them can limit disturbances in the bypass flow and thus increase the global efficiency of the turbomachine.

However, it is possible to improve solutions according to prior art. In particular, there is a need to improve heat exchanges to further increase the heat dissipation capacity. There is also a need to reinforce the mechanical strength and the leak tightness to resist the high pressures generated by circulation of lubricant inside these vanes. The need to reinforce the mechanical strength is particularly high in the special case of a guide vane with a structural function. Finally, there is a need to create a design to facilitate fabrication of such a vane with integrated exchanger.

SUMMARY OF THE INVENTION

In order to at least partially satisfy these needs, the first purpose of the invention is a guide vane designed to be positioned in all or some of an air flow in a twin-spool aircraft turbomachine fan, the guide vane comprising a root, a tip and an aerodynamic flow straightening part located between the root and the tip of the vane, said aerodynamic part of the vane comprising a first internal lubricant cooling passage extending along a first main lubricant flow direction from the root towards the tip of the vane, said first internal passage being partly limited by an intrados wall and an extrados wall of the vane.

According to the invention, the aerodynamic part of the vane is made in a single piece and also comprises heat transfer fins arranged in the first passage connecting the intrados and extrados walls and extending approximately parallel to the first direction, said fins being distributed in successive rows of fins following each other along the first principal direction and made such that for a first row and a second row of directly consecutive staggered fins, the first row comprises at least several fins forming a positive acute angle A1 with a dummy reference plane of the vane parallel to the first direction, while the second row comprises at least several fins forming a negative acute angle A2 with said dummy reference plane.

Due to fabrication in a single piece, the invention can overcome leak tightness and mechanical strength problems encountered in known embodiments according to prior art, particularly in the solution described in document U.S. Pat. No. 8,616,834. Furthermore, inverse inclinations of the fins that connect the intrados and extrados parts provide improved mechanical strength, in that they behave like a lattice.

The fact that the fins and the intrados and extrados walls are made in a single piece also improves thermal conduction towards these walls. In this respect, note also that the various fin inclinations and their arrangement in rows give good thermal performances, while limiting head losses in the lubricant passing through the first internal passage fitted with fins.

Finally, note that due to the inclination of the fins at angles A1 and A2, the fins can easily be made by additive fabrication, particularly by orienting the vane to be fabricated such that its dummy reference plane is parallel to the vane support surface during this fabrication.

The invention also has at least one of the following optional characteristics, taken in isolation or in combination.

Each of the fins of the vane forms a positive acute angle A1 or a negative acute angle A2 with the dummy reference plane, these angles A1, A2 being between 30 and 60°.

According to one preferred embodiment of the invention, for a first and a second row of directly consecutive staggered fins, all fins in the first row form a positive acute angle A1 with the dummy reference plane, while all fins in the second row form a negative acute angle A2 with said dummy reference plane. For information, note that in this description, the positive direction is the clockwise direction from the dummy reference plane, while the negative direction is the anticlockwise direction. However, an inverse solution could be adopted without going outside the scope of the invention.

Preferably, the positive acute angle A1 is almost identical for all fins in the first row, while the negative acute angle A2 is almost identical for all fins in the second row. Nevertheless, the value of the angle could vary within each row, without going outside the scope of the invention.

Furthermore, it is also preferable if the fins in the first row are at a uniform spacing from each other along a transverse direction of the vane from a leading edge towards a trailing edge of its aerodynamic part, if the fins in the second row are at a uniform spacing from each other along the transverse direction, and when viewed along the first direction, the fins in the first row are arranged between the fins of the second row, so as to jointly form a broken line. Nevertheless, in the same view along this first direction, the separation distances and/or crossings between the fins can be adopted without going outside the framework of the invention.

According to a second preferred embodiment of the invention, for a first and second row of directly consecutive staggered fins, each of these rows comprises fins in alternation along a transverse direction of the vane from a leading edge towards a trailing edge of its aerodynamic part, fins with each fin forming a positive acute angle A1 with the dummy reference plane and fins with each fin forming a negative acute angle A2 with said dummy reference plane.

Preferably, when viewed along the first direction, the fins in the first row jointly form a first broken line and the fins in the second row jointly form a second broken line, the first and the second broken lines being offset from each other along the transverse direction such that at least some of the fins in the first row cross at least some of the fins in the second row.

Even more preferably, the first and the second broken lines are periodic with the same period T, and they are offset from each other along the transverse direction by a value equal to T/n, where n is a positive integer number preferably between two and four.

Regardless of the envisaged embodiment, the first internal passage preferably comprises at least one zone in which side heat transfer fins are installed at a density of between 1 and 5 fins/cm². This density can be uniform in the first passage, or it can be variable. In particular, this possibility of varying the density of the fins makes it possible to locally adapt heat exchanges between the lubricant and the bypass flow.

The vane may include only a first passage, for circulation of lubricant radially outwards. In this case, the ring of guide vanes would then comprise at least one other vane with a similar design, with an internal passage for circulation of lubricant radially inwards.

However, the aerodynamic part of the vane preferably also comprises a second internal lubricant cooling passage extending along a second principal lubricant flow direction from the tip towards the root of the vane. This second internal passage is then preferably equipped with fins arranged based on the same principle or a principle similar to that observed in the first internal passage.

According to one possibility, each of the first and the second internal passages extends separately through the entire aerodynamic part of the vane.

According to another possibility, there is a fluid connection between the first and the second internal passages close to the tip of the vane and the average density of fins within the first internal passage is then preferably less than the density of fins inside the second internal passage. Since the lubricant is colder in the return direction adopted within the second internal passage, the exchanged thermal power can be increased by increasing the average density of fins in this second passage.

Preferably, the guide vane performs a structural function, in that it transfers forces from the centre of the turbomachine to an outer shell located along the prolongation of the fan case.

Preferably, the aerodynamic part made in a single piece also includes heat transfer fins made in a second internal lubricant cooling passage extending along a second principal lubricant flow direction from the tip towards the root of the vane, in which there is a fluid connection between said second internal passage and the first internal passage through a bend in which there are no heat transfer fins. Thus, the layout of fins in the second internal passage is identical to or similar to the layout in the first internal passage.

Another purpose of the invention is an aircraft turbomachine, preferably a turbojet, comprising a plurality of guide vanes like those described above, arranged downstream or upstream from a fan of the turbomachine.

Finally, another purpose of the invention is a method of fabrication of such a guide vane, said aerodynamic part of the vane being made in a single piece by additive fabrication, with the dummy reference plane of the vane being located parallel to a vane support surface during fabrication.

Other advantages and characteristics of the invention will become clear after reading the following non-limitative detailed description.

BRIEF DESCRIPTION OF THE DRAWINGS

This description will be made with reference to the appended drawings among which.

DETAILED DESCRIPTION OF PREFERRED EMBODIMENTS

Figure 1:
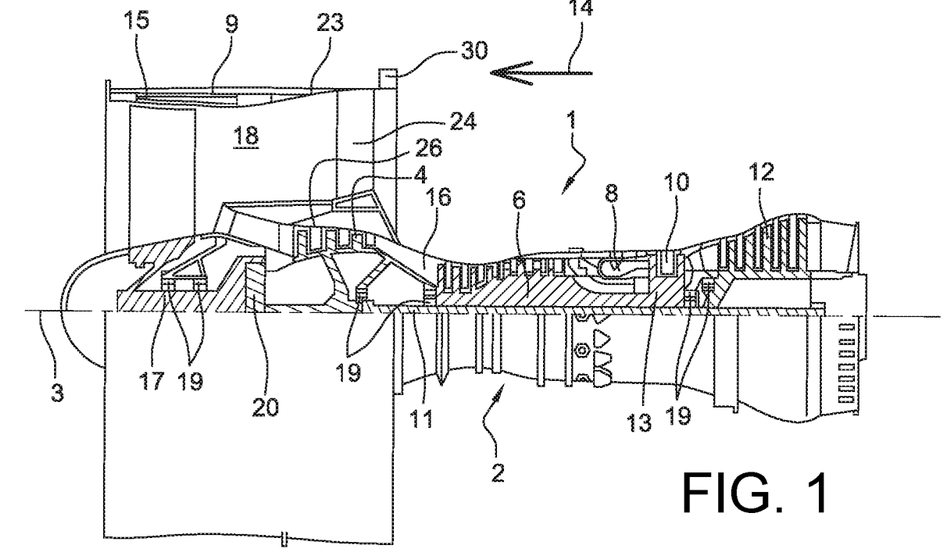
FIG. 1 diagrammatically represents a side view of a turbojet according to the invention.

With reference to FIG. 1, the figure represents a twin-spool twin-flow turbojet, with a high dilution ratio. The turbojet 1 conventionally comprises a gas generator 2 with a low pressure compressor 4 on one side and a low pressure turbine 12 on the other side, this gas generator 2 comprising a high pressure compressor 6, a combustion chamber 8 and a high pressure turbine 10. In the following, the terms "forward from" and aft from" are considered along a direction 14 opposite to the main flow direction of gases in the turbojet, this direction 14 being parallel to the longitudinal axis 3 of the turbojet. On the other hand, the terms "upstream" and "downstream" are considered along the main flow direction of gases within the turbojet.

The low pressure compressor 4 and the low pressure turbine 12 form a low pressure case, and are connected to each other through a low pressure shaft 11 centred on the axis 3. Similarly, the high pressure compressor 6 and the high pressure turbine 10 form a high pressure case, and are connected to each other through a high pressure shaft 13 centred on the axis 3 and arranged around the low pressure shaft 11. The shafts are supported by bearing blocks 19 that are lubricated by being located in oil chambers. The same applies for the fan hub 17, also supported by roller bearings 19.

The turbojet 1 also comprises a single fan 15 located forward from the gas generator 2 and the low pressure compressor 4, in this case a single fan 15 that is located directed aft from the engine nose dome. The fan 15 rotates about the axis 3, and is surrounded by a fan case 9. On FIG. 1, it is not driven by the low pressure shaft 11 directly, but is only driven by this shaft indirectly through a reduction gear 20, so that it can rotate at a lower speed. Nevertheless, a direct drive solution for the fan 15, by the low pressure shaft 11, is within the scope of the invention.

Furthermore, the turbojet 1 defines a core path 16 through which a core flow will pass, and a bypass path 18 through which a bypass flow will pass and that is radially outside the core flow, therefore the bypass flow being separated. As is well known to an expert in the subject, the bypass path 18 is delimited radially externally partly by an outer shell 23, preferably metallic, prolonging the fan case 9 in the aft direction.

Although not shown, the turbojet 1 is equipped with a set of equipment, for example such as a fuel pump, a hydraulic pump, alternator, starter, variable stator vane (VSV) actuator, discharge valve actuator, or electrical power generator. In particular, there is equipment for lubrication of the reduction gear 20. This equipment is driven by an accessories gear box (AGB) (not shown) that is also lubricated.

There is a ring of guide vanes that in this case are outlet guide vanes 24 (OGV) in the bypass path 18, downstream from the fan 15. These stator vanes 24 connect the outer shell 23 to a casing 26 surrounding the low pressure compressor 4. They 24 are circumferentially spaced from each other to straighten the bypass flow after it has passed through the fan 15. Furthermore, these vanes 24 can also perform a structural function, as is the case in the example embodiments described above. They transfer forces from the reduction gear and roller bearings 19 of the engine shafts and the fan hub, to the outer shell 23. These forces can then transit through an engine attachment 30 fixed onto the shell 23 connecting the turbojet to an attachment pylon (not shown) of the aircraft.

Finally, in the example embodiments described herein, the outlet guide vanes 24 perform a third heat exchange function between the bypass air flow passing through the ring of vanes, and the lubricant circulating inside these vanes 24. The lubricant that will be cooled by the outlet guide vanes 24 is the lubricant that lubricates the roller bearings 19, and/or the turbojet equipment, and/or the accessories gearbox, and/or the reduction gear 20. These vanes 24 thus form part of the fluid circuit(s) in which lubricant is circulated to lubricate the associated element(s) successively, and then to be cooled.

With reference to FIGS. 2 to 5, we will describe one of the outlet guide vanes 24, according to a first preferred embodiment of the invention. In this respect, it should be noted that the invention as it will be described with reference to FIGS. 2 to 5 can be applied to all vanes 24 of the stator ring centred on the axis 3, or only to some of these vanes.

Figure 2:
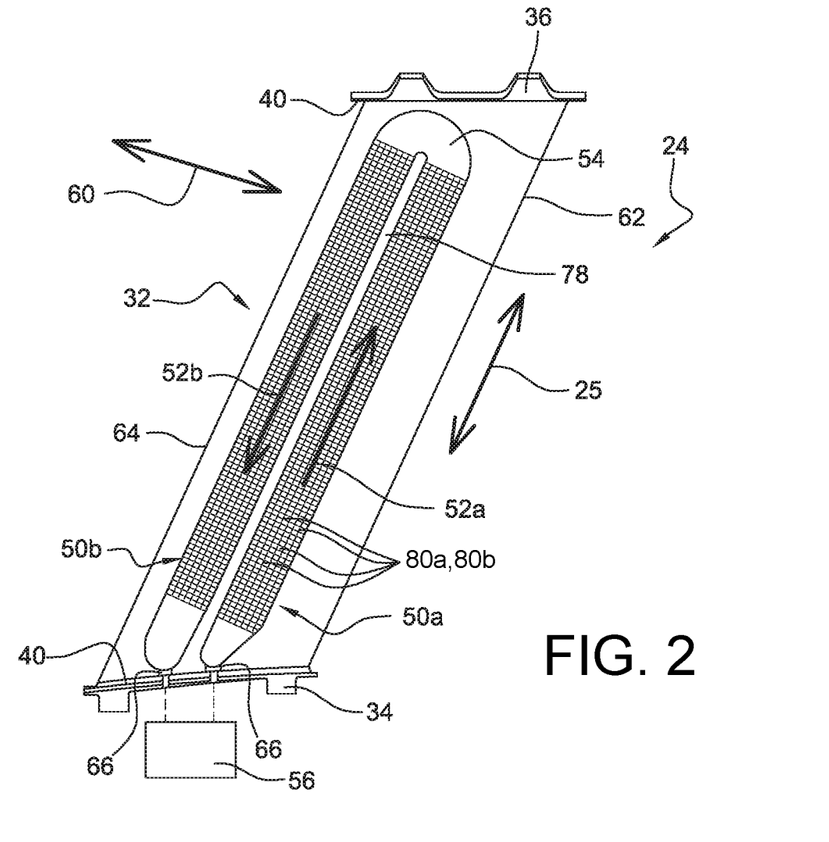
FIG. 2 represents a more detailed enlarged view of an outlet guide vane of the turbojet shown on the previous figure, according to a first preferred embodiment of the invention.

The vane 24 may be oriented precisely along the radial direction as shown on FIG. 1, or it can be slightly inclined in the axial direction as shown on FIG. 2. In all cases, it is preferably straight when viewed from the side as shown on FIG. 2, and extends along a direction of the length 25.

The outlet guide vane 24 comprises an aerodynamic part 32 that corresponds to its central part, in other words the part exposed to the bypass flow. The vane 24 comprises a root 34 on one side of this aerodynamic part 32 straightening the outlet flow from the fan, and a tip 36 on the other side.

The root 34 is used to fix the vane 24 to the low pressure compressor case, while the tip is used to fix this vane onto the outer shell prolonging the fan case. Furthermore, the vane 24 comprises platforms 40 at its root and its tip to reconstitute the bypass path between the vanes 24 along the circumferential direction.

One of the special features of the invention lies in the fabrication of the aerodynamic part 32 of the vane in a single piece, preferably by additive fabrication called 3D printing or direct fabrication. Additive fabrication of the aerodynamic part 32 may for example be done by any one of the following techniques:

Selective Laser Melting" (SLM) or "Electron Beam Melting" (EBM);
"Selective Laser Sintering" (SLS) or sintering by electron beam;
any other type of powder solidification technique under the action of a medium to high power energy source, the principle being to melt or sinter a metallic powder bed by laser beam or electron beam.

The powder used is based on aluminium or another metallic material.

Furthermore, fabrication of the single part may include the root 34, and/or the tip 36 and/or the platforms 40, without going outside the scope of the invention.

Figure 3:
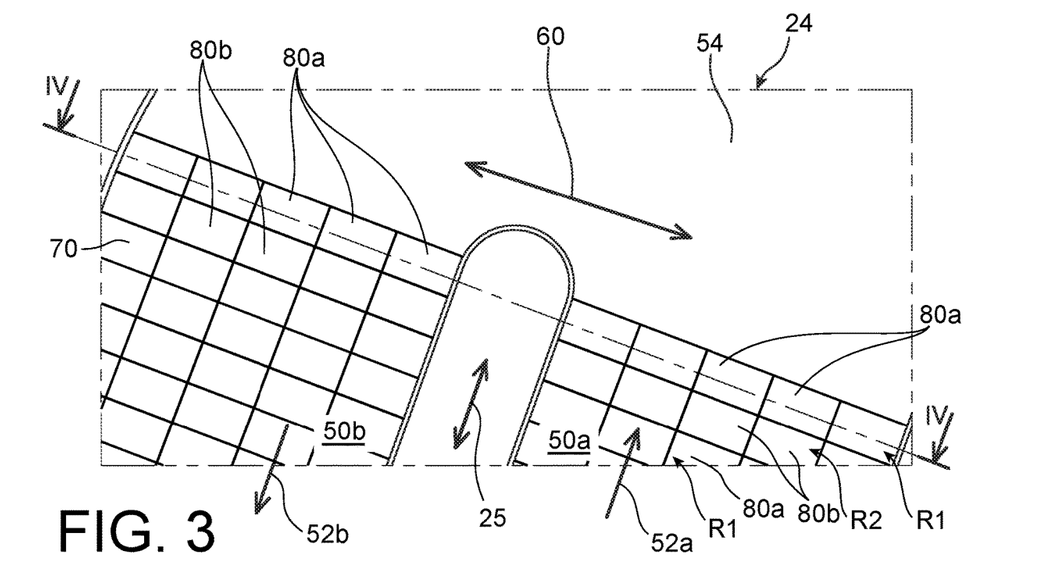
FIG. 3 is an enlarged view of part of the outlet guide vane shown on the previous figure.

In this first preferred embodiment of the invention, the aerodynamic part 32 is equipped with two internal passages 50a, 50b approximately parallel to each other and parallel to the length direction 25. More precisely, a first internal lubricant cooling passage 50a extends along a first main flow direction 52a of the lubricant. This direction 52a is approximately parallel to the length direction 25, along the direction from the root 34 towards the tip 36. Similarly, there is a second internal lubricant cooling passage 50b that extends along a second main flow direction 52b of the lubricant, within this passage. This direction 52b is also approximately parallel to the length direction 25, along the opposite direction from the tip 36 towards the root 34. Therefore the first passage 50a is designed so that lubricant can pass through it radially outwards, while the second passage 50b is designed so that lubricant passes through it radially inwards. The radially outer ends of the two passages 50a, 50b are provided with a fluid connection passing through a 180° bend 54, corresponding to a hollow formed in the aerodynamic part 32, to connect one passage to the other. Alternatively, the passages 50a, 50b are not connected to each other within the aerodynamic part 32 of the vane 24, but each extends separately over the entire length of the aerodynamic part 32. A fluid connection can be made between the two passages outside the vane 24, for example using a connection bend formed radially outwards from the vane tip 36, for example bearing on this tip.

The internal radial ends of the two passages 50a, 50b are connected to the lubricant circuit 56, diagrammatically represented by element 56 on FIG. 2. In particular, this circuit 56 comprises a pump (not shown), that imposes the required circulation direction on the lubricant through the passages 50a, 50b, namely to introduce lubricant through the inner radial end of the first passage 50a, and to extract lubricant through the internal radial end of the second passage 50b. Connectors 66 make the fluid communication between the internal radial ends of the passages 50a, 50b and the circuit 56, these connectors 66 passing through the root 34.

The two passages 50a, 50b and the bend 54 together generally form a U shape, with the first passage 50a and the second passage 50b offset from each other along a transverse direction 60 of the vane approximately orthogonal to the length direction 25. In this first preferred embodiment and in all other embodiments, heat exchanges are optimised by having the first passage 50a adjacent to a trailing edge 62 of the vane 24, while the second passage 50b is adjacent to a leading edge 64. However, an inverse situation can be adopted without going outside the scope of the invention.

Figure 4:
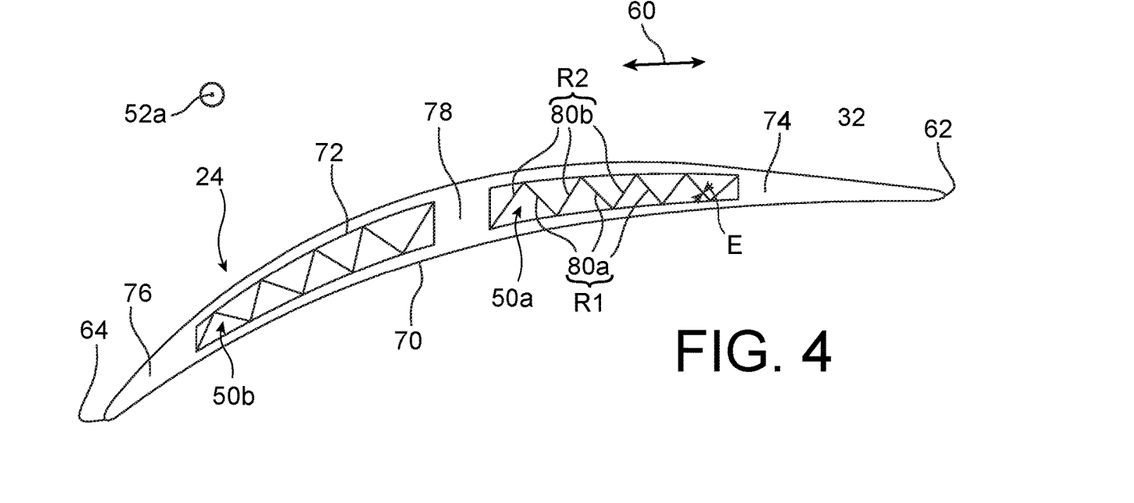
FIG. 4 is a sectional view along line IV-IV in FIG. 3.

The aerodynamic part 32 of the outlet guide vane 24 comprises an intrados wall 70, an extrados wall 72, a solid zone 74 connecting the two walls 70, 72 close to the trailing edge 62, a solid zone 76 connecting the two walls 70, 72 close to the leading edge 64, and a central solid zone 78. The latter zone 78 connects the two walls 70, 72 at an approximately central portion of the walls, along the direction of the chord of the vane. It also provides a structural reinforcement and extends from the root 34 to the bend 54, while the solid zones 74, 76 extend approximately along the entire length of the part 32, along the length direction 25. The first passage 50a is formed between the walls 70, 72 and between the solid zones 74, 78, while the second passage 50b is formed between the walls 70, 72 and between the solid zones 76, 78. The intrados and extrados walls 70, 72 have approximately constant thicknesses facing the passages 50a, 50b that they delimit. On the other hand, the passages 50a, 50b extend in the transverse direction 60 with a variable thickness between the two walls 70, 72, as can be seen on FIG. 4a. The maximum thickness of these passages may be of the order of 1 to 2 mm. Alternatively, the passages 50a, 50b could have a constant thickness, but in this case the two walls 70, 72 would have a variable thickness to obtain the aerodynamic profile of the vane.

The two internal lubricant cooling passages 50a, 50b are specific in that they comprise heat transfer fins. In this first preferred embodiment of the invention, the layout and the shape of the fins 80a, 80b are approximately identical or similar in the two passages 50a, 50b. They are also installed with the same densities, although the densities could be different without going outside the scope of the invention. Consequently, only the fins 80a, 80b in the first internal passage 50a will be described below, but it should be understood that this description is equally applicable by analogy to the fins in the second internal passage 50b. It is also noted that the bend 54 defines an internal space that is preferably free of fins.

The fins 80a, 80b in the first passage 50a are approximately parallel to the direction 52a. The fin height along this direction is of the order of 1 mm or even less, while the value of their thickness is preferably constant, preferably between 0.5 and 1.5 mm. In at least one zone of the passage 50a, and preferably in the entire passage, the fins 80a, 80b are designed to have a density equal for example to about 3 fins/cm$^2$. More generally, the density is between about 1 and 5 fins/cm$^2$ on average.

The fins are distributed in rows R1, R2 that succeed each other along the first direction 52a, each row being approximately straight and parallel to the transverse direction 60. Thus, there are several tens of row of fins in the passage 50a, that succeed each other along the first direction 52a. Furthermore, the fins 80a, 80b within each row are uniformly spaced along the direction 60.

Figure 4B:
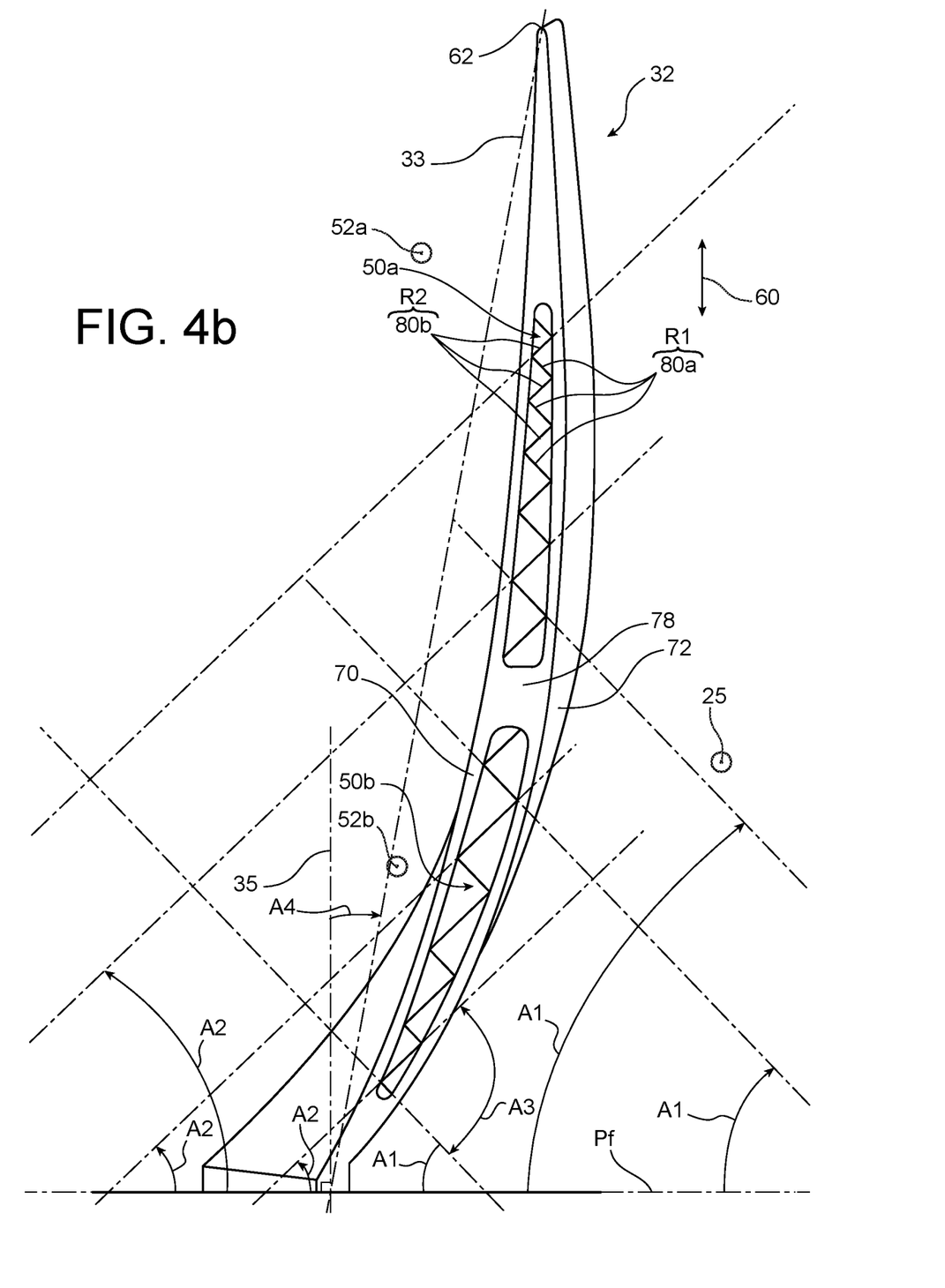
FIG. 4b is a view from the aft side of the vane shown on FIGS. 2 to 4a, representing the vane in its position as adopted during manufacturing by additive fabrication.

In this first preferred embodiment of the invention, for two directly consecutive rows R1, R2 along the first direction 52a, all fins 80a in the first row R1 are inclined by the same positive angle A1 relative to a dummy plane Pf shown on FIG. 4b. This plane Pf in this case is such that the leading edge 64 is inscribed in it. Furthermore, the chord line 33 at the internal end of the aerodynamic part 32 forms a positive acute angle A4 of a few degrees from the normal 35 to the dummy plane Pf. The angle A4 may for example be between 5 and 15°. The angle A1 associated with the parallel fins 80a is of the order of 30 to 60°, and preferably of the order of 45°.

Similarly, all fins 80b within the second row R2 are parallel to each other and are inclined by a negative acute angle A2 from the dummy plane Pf, this angle A2 preferably have the same absolute value as the angle A1.

As can be seen on FIGS. 4a and 4b, in which the views are taken along the first direction 52a, the first fins 80a are located between the second fins, and vice versa. The length of the fins preferably being identical or similar within the two rows. When seen along the first direction 52a, the assembly of these fins forms a broken line in which the different successive segments are in planes offset in direction 52a, these segments being inclined from each other by an angle A3. In this case, the angles A3 are of the order of 90°. Nevertheless, it is important to realise that this line is only fictitious, considering that the fins 80a and the fins 80b are inscribed in two distinct rows offset from each other along direction 52a. In other words, in a view along direction 52a, the fins 80a, 80b have coincident connection points, at which connection fillets could be provided (not shown) to increase the stiffness of the fins during fabrication, and also to limit stress concentrations on the part when in use.

Figure 5:
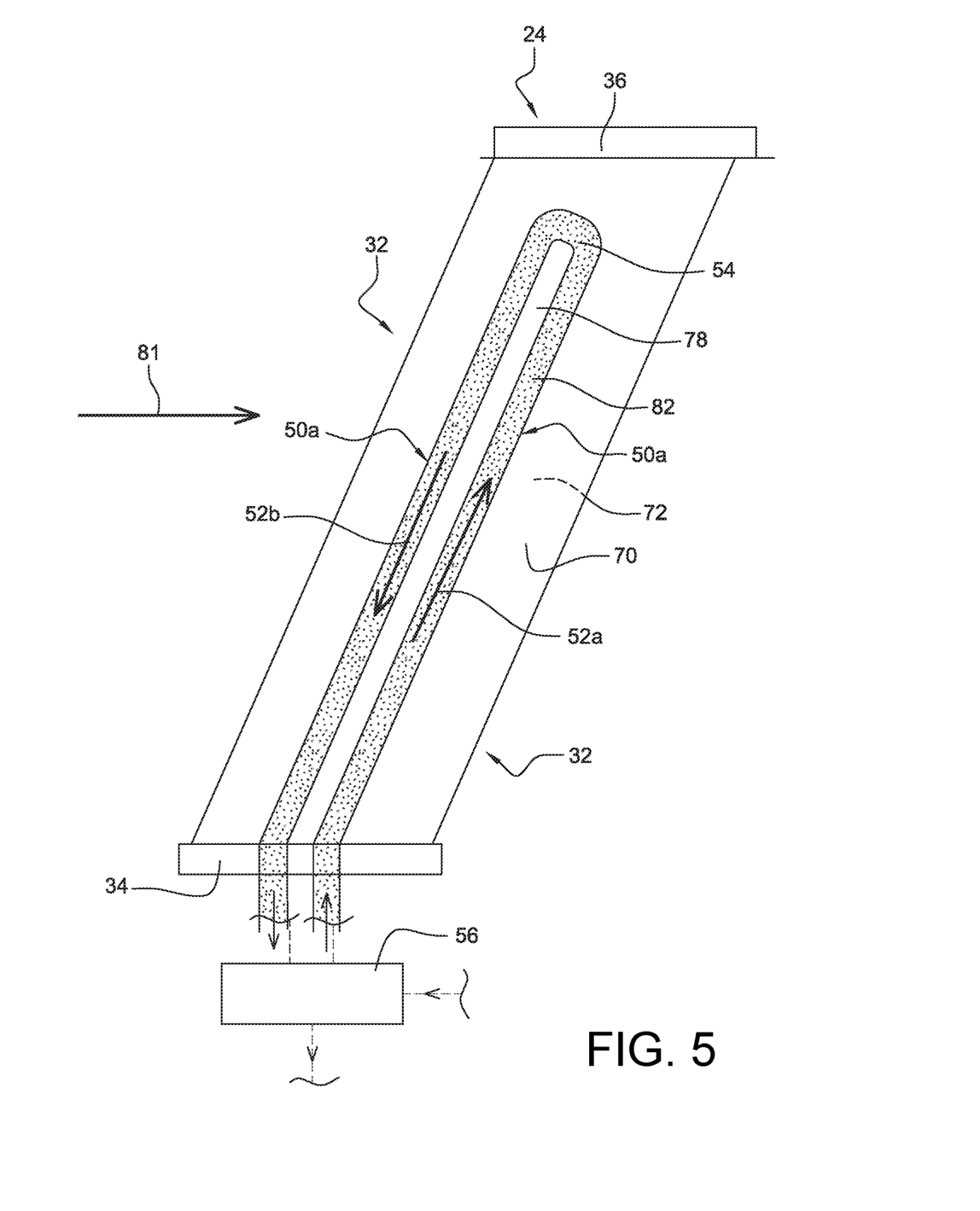
FIG. 5 shows operation of the heat exchanger composed of the outlet guide vane shown on the previous figures.

During operation shown diagrammatically in FIG. 5, lubricant 82 circulating through the circuit 56 is introduced into the first internal passage 50a along the first radially outwards direction 52a. The temperature of the lubricant 82 at this stage is high. Heat exchange then takes place between this lubricant 82 following the fins (not shown in FIG. 5) in the first 50a, and the bypass flow 81 following the external surface of the intrados and extrados walls 70, 72 supporting these fins. After having been redirected by the bend 54 into the second passage 50b, the lubricant 82 is similarly cooled in this passage, still by heat exchange with the bypass air flow 81, while circulating along the second main flow direction 52b. The cooled lubricant 82 is extracted from the vane 24 and redirected through the closed circuit 56 towards elements to be lubricated and/or to a lubricant tank from which the lubricant is pumped to lubricate elements.

As mentioned above, the aerodynamic part 32 of the vane is made in a single piece by additive fabrication. The preferred orientation of the vane during fabrication is shown on FIG. 4b. It is such that the dummy reference plane Pf is located approximately parallel to a vane support surface located on a fabrication frame (not shown). More preferably and as shown on FIG. 4b, this support surface is coincident with the plane Pf in which the leading edge 64 is inscribed. Consequently fabrication is done by superposition of layers in a stacking direction approximately orthogonal to the leading edge. During this fabrication, the fins 80a, 80b can thus be constructed at angles A1 and A2 that guarantee easy fabrication while limiting the length along which they extend between the intrados and extrados walls 70, 72.

Figures 6, 7:
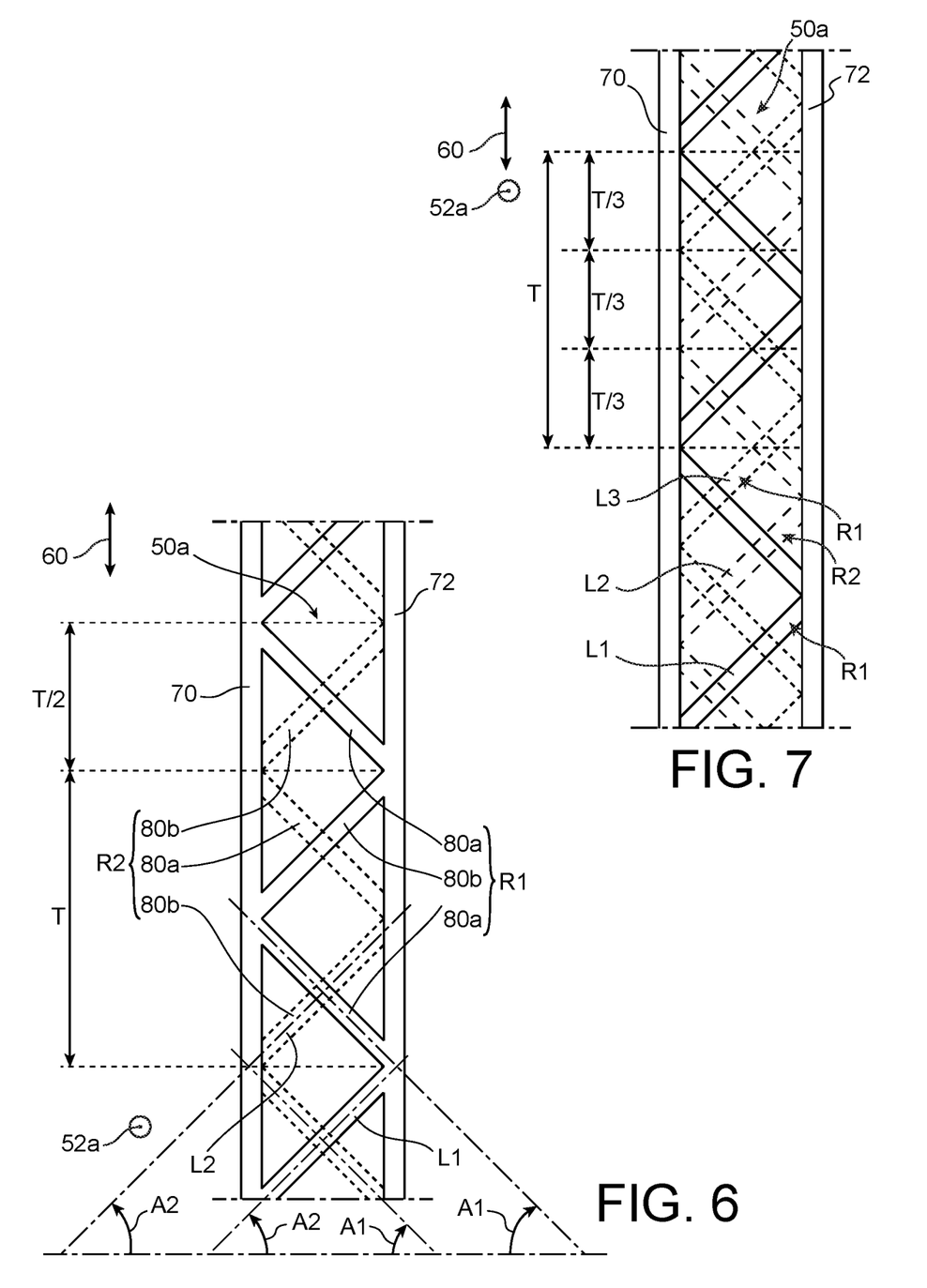
FIG. 6 is a partial view similar to the view shown on FIG. 4b, with the outlet guide vane being in the form of a second preferred embodiment of the invention.
FIG. 7 is a view similar to that in FIG. 6, according to an alternative embodiment.

According to a second embodiment shown on FIG. 6, each row R1, R2 comprises an alternation of fins 80a along the transverse direction 60, each fin forming a positive acute angle A1 with the dummy reference plane Pf, and fins 80b each forming a negative acute angle A2 with this same plane. Also, instead of incorporating fins all with the same direction of inclination, each row R1, R2 comprises fins arranged in alternation with inverted directions of inclination, in order to form broken lines each inscribed in a plane.

Preferably, for two directly consecutive staggered rows R1, R2, the first and second broken lines L1, L2 respectively formed by these rows are offset from each other along direction 60, and have the same period T. Thus, in a view along direction 52a, the fins 80a in the first row R1 cross the fins 80b in the second row R2, and vice versa.

In the second embodiment shown in FIG. 6, the value of the offset between two lines L1, L2 along direction 60 is equal to the value T/2. The fins in two consecutive rows are thus in phase opposition, and cross approximately at their centre.

According to the alternative shown on FIG. 7, the offset between two directly consecutive rows is equal to a value of T/3. In a view along direction 52a, three broken lines L1, L2, L3 can be seen, formed by three directly consecutive rows R1, R2, R1 respectively.

Obviously, an expert in the subject can make various modifications to the invention as it has just been described solely through non-limitative examples. In particular, the technical characteristics specific to each embodiment described above can be combined together without going outside the scope of the invention. Finally, note that in the case (not shown) of inlet guide vanes to straighten the air flow upstream from the fan, these vanes are located in the entire fan air flow around a non-rotating air inlet cone, the roots of the vanes then being connected to this fixed air inlet cone.

The invention claimed is:

1. A guide vane configured to be positioned in all or some of an air flow in a twin-spool aircraft turbomachine fan, the guide vane comprising:
   a root, a tip and, an aerodynamic flow straightening part located between the root and the tip of the guide vane, said aerodynamic flow straightening part of the guide vane comprising a first internal lubricant cooling passage extending along a first main lubricant flow direction from the root towards the tip of the guide vane, said first internal lubricant cooling passage being partly limited by an intrados wall and an extrados wall of the guide vane,
   wherein the aerodynamic flow straightening part of the guide vane is made in a single piece and also comprises heat transfer fins arranged in the first passage, each of the fins including a first end in direct contact with the intrados wall and a second end in direct contact with the extrados wall to connect the intrados and extrados walls, each of the fins extending approximately parallel to the first main lubricant flow direction, said fins being distributed in successive rows of fins following each other along the first main lubricant flow direction and made such that for a first row and a second row of staggered directly consecutive fins, the first row comprising at least several fins forming a positive acute angle A1 with a dummy reference plane of the guide vane parallel to the first main lubricant flow direction, while the second row comprises at least several fins forming a negative acute angle A2 with said dummy reference plane, the first row of fins and the second row of fins alternate in the first main lubricant flow direction.

2. The guide vane according to claim 1, wherein the positive acute angle A1 and the negative acute angle A2 are between 30 and 60°.

3. The guide vane according to claim 1, wherein for the first row and the second row of directly consecutive staggered fins, all fins in the first row form the positive acute angle A1 with the dummy reference plane, while all fins in the second row form the negative acute angle A2 with said dummy reference plane.

4. The guide vane according to claim 3, wherein the positive acute angle A1 is identical for all fins in the first row, while the negative acute angle A2 is identical for all fins in the second row.

5. The guide vane according to claim 3, wherein the fins in the first row are at a uniform spacing from each other along a transverse direction of the guide vane from a leading edge towards a trailing edge of the aerodynamic flow straightening part, the fins in the second row are at a uniform spacing from each other along the transverse direction, and when viewed along the first main lubricant flow direction, the fins in the first row are arranged between the fins of the second row, so as to jointly form a broken line.

6. The guide vane according to claim 1, wherein, for the first row and the second row of directly consecutive staggered fins, each of these rows comprises fins in alternation along a transverse direction of the guide vane from a leading edge towards a trailing edge of the aerodynamic flow straightening part, with each fin forming the positive acute angle A1 with the dummy reference plane and with each fin forming the negative acute angle A2 with said dummy reference plane.

7. The guide vane according to claim 6, wherein, when viewed along the first main lubricant flow direction, the fins in the first row jointly form a first broken line and the fins in the second row jointly form a second broken line, the first and the second broken lines being offset from each other along the transverse direction such that at least some of the fins in the first row cross at least some of the fins in the second row.

8. The guide vane according to claim 6, wherein the first broken line and the second broken line are periodic with the same period T, and they are offset from each other along the transverse direction by a value equal to T/n, where n is a positive integer number preferably between two and four.

9. The guide vane according to claim 1, wherein the aerodynamic flow straightening part made in a single piece also includes heat transfer fins made in a second internal lubricant cooling passage extending along a second principal lubricant flow direction from the tip towards the root of the guide vane, in which there is a fluid connection between said second internal lubricant cooling passage and the first internal lubricant cooling passage through a bend in which there are no heat transfer fins.

10. A turbomachine for an aircraft, comprising:
    a plurality of guide vanes according to claim 1, located downstream or upstream from the twin-spool aircraft turbomachine fan of the turbomachino.

11. A method of fabrication of the guide vane according to claim 1, wherein said aerodynamic flow straightening part of the guide vane is made in a single piece by additive fabrication, with the dummy reference plane of the guide vane being located parallel to a vane support surface during fabrication.

12. The guide vane according to claim 1, wherein the aerodynamic flow straightening part made in a single piece also includes a second internal lubricant cooling passage extending along a second principal lubricant flow direction from the tip towards the root of the guide vane, the second principal lubricant flow direction being parallel to the first principal lubricant flow direction.

13. The guide vane according to claim 12, further comprising a bend that provides a fluid connection between said second internal lubricant cooling passage and the first internal lubricant cooling passage.

14. The guide vane according to claim 12, wherein said second internal lubricant cooling passage is adjacent to a leading edge of the guide vane and the first internal lubricant cooling passage is adjacent to a trailing edge of the guide vane.

15. The guide vane according to claim 9, wherein said second internal lubricant cooling passage is adjacent to a leading edge of the guide vane and the first internal lubricant cooling passage is adjacent to a trailing edge of the guide vane.

\* \* \* \* \*

UNITED STATES PATENT AND TRADEMARK OFFICE
CERTIFICATE OF CORRECTION

PATENT NO. : 10,697,312 B2
APPLICATION NO. : 15/914150
DATED : June 30, 2020
INVENTOR(S) : Mohamed-Lamine Boutaleb et al.

Page 1 of 1

It is certified that error appears in the above-identified patent and that said Letters Patent is hereby corrected as shown below:

In the Claims

In Column 10, Line 52, Claim 10, delete "fan of the turbomachino." and insert -- fan. --.

Signed and Sealed this
Eighth Day of December, 2020

Andrei Iancu
*Director of the United States Patent and Trademark Office*